United States Patent
Raghavan et al.

(10) Patent No.: US 7,085,293 B2
(45) Date of Patent: Aug. 1, 2006

(54) SCALEABLE TRANSPORT OF TDM CHANNELS IN A SYNCHRONOUS FRAME

(75) Inventors: Ramji Raghavan, Waltham, MA (US); Surya Kumar Kovvali, Westborough, MA (US)

(73) Assignee: Telsima Inc., Santa Clara, CA (US)

( * ) Notice: Subject to any disclaimer, the term of this patent is extended or adjusted under 35 U.S.C. 154(b) by 881 days.

(21) Appl. No.: 09/858,019

(22) Filed: May 15, 2001

(65) Prior Publication Data
US 2002/0009100 A1 Jan. 24, 2002

Related U.S. Application Data (63) Continuation-in-part of application No. 09/536,416, filed on Mar. 28, 2000
(60) Provisional application No. 60/245,387, filed on Nov. 2, 2000, and provisional application No. 60/245,262, filed on Nov. 2, 2000.

(51) Int. Cl.
*H04L 12/28* (2006.01)

(52) U.S. Cl. .................... 370/506; 370/406; 370/539
(58) Field of Classification Search ............. 370/222, 370/503, 504, 505, 509, 535, 538, 539, 540, 370/907, 916, 406, 431, 541
See application file for complete search history.

(56) References Cited

U.S. PATENT DOCUMENTS

| | | | |
|---|---|---|---|
| 3,988,545 A | 10/1976 | Kuemmerle et al. | |
| 4,093,823 A | 6/1978 | Chu | |
| 4,494,232 A | 1/1985 | Dambrackas et al. | |
| 4,998,242 A | 3/1991 | Upp | |
| 5,241,543 A * | 8/1993 | Amada et al. ............. | 370/509 |
| 5,257,261 A | 10/1993 | Parruck et al. | |
| 5,282,200 A | 1/1994 | Dempsey et al. | |
| 5,327,428 A | 7/1994 | Van As et al. | |
| 5,566,177 A | 10/1996 | Bhandari et al. | |
| 6,052,386 A | 3/1997 | Achilleoudis et al. | |
| 5,631,906 A | 5/1997 | Liu et al. | |
| 5,648,958 A | 7/1997 | Counterman | |
| 5,867,484 A | 2/1999 | Shaunfield | |
| 5,751,720 A | 3/1999 | Uematsu et al. | |
| 6,202,082 B1 | 3/2001 | Tomizawa et al. | |
| 6,246,667 B1 | 6/2001 | Ballintine et al. | |
| 6,754,210 B1 | 6/2004 | Ofek | |
| 6,762,994 B1 | 7/2004 | Mitchell et al. | |
| 6,785,228 B1 | 8/2004 | Vandette et al. | |
| 6,785,288 B1 | 8/2004 | Enns et al. | |
| 6,798,776 B1 | 9/2004 | Cheriton et al. | |

\* cited by examiner

*Primary Examiner*—Brenda Pham
(74) *Attorney, Agent, or Firm*—Fish & Richardson P.C.

(57) ABSTRACT

A method and system for processing communication at a node in a communication system makes use a series of fixed-length data frames in which multiple data streams are multiplexed. Each of the data streams originates from a corresponding source of data in the communication system, and least two of the data streams originate from a same source of data. For each of the series of fixed-length frames that are processed at a node, multiple offsets within the fixed-length frame are identified, each of these offsets being associated with a different one of the sources of data. The data streams which are multiplexed in the series of fixed-length frames are then processed. For each of the data streams, in each of the series of fixed-length frames, that data stream is processed according to the offset identified for that frame that is associated with the source of that data stream. The approach is applicable to SONET communication in which multiple data streams are multiplexed in a series of synchronous payload envelopes (SPEs), and data encoded in each SPE identifies offsets that characterize displacements, such as row offsets, in the SPE that are each associated with a different source node in the SONET network. An advantage of this approach is that pointer processing scales approximately according to the number of nodes in the system rather than to the number of channels being processed.

13 Claims, 8 Drawing Sheets

SCALEABLE TRANSPORT OF TDM CHANNELS IN A SYNCHRONOUS FRAME

CROSS-REFERENCE TO RELATED APPLICATIONS

This application is a continuation-in-part application of U.S. application Ser. No. 09/536,416, "Transport of Isochronous and Bursty Data on a SONET Ring," filed on Mar. 28, 2000, which is incorporated herein by reference. This application also claims the benefit of U.S. Provisional Application Ser. Nos. 60/245,387 and 60/245,262, both filed on Nov. 2, 2000, and both of which are incorporated herein by reference.

BACKGROUND

This invention relates to transport of time-division multiplexed data traffic in a synchronous communication system.

Fixed-rate data traffic can be transported using time-division multiplexing (TDM) of synchronous data frames. The approach to multiplexing data traffic in conventional SONET/SDH (Synchronous Optical Network/Synchronous Digital Hierarchy) systems is an example of such a TDM approach. SONET/SDH standards were developed as an evolution of legacy copper based transmission equipment to serve as a next generation/broadband transport of voice traffic over fiber optic infrastructure.

The first generation of digital transmission equipment used physical layer technologies that were encompassed under three regional digital signal hierarchies. The North American hierarchy consists of DS0 (64 kb/s), DS1 (1.544 Mb/s), DS1c (3.152 Mb/s), DS2 (6.312 Mb/s), DS3 (44.736 Mb/s), DS3C (91.035 Mb/s) and DS4 (274.176 Mb/s) signals. The European hierarchy consists of E0 (64 kb/s), E1 (2.048 Mb/s), E2, E3 and E4 signals. The majority of the broadband optical fiber communications are based today on the SONET/SDH family of standards (SDH is essentially the international standard corresponding to SONET). The standards provide mechanisms to transport circuit switched traffic streams within higher speed SONET "pipes," which are aggregated streams of multiplexed low speed traffic. A series of Bellcore and ANSI specifications define data formats of payload containers (typically referred to as virtual tributaries, or VTs) to carry legacy traffic rates (DS1, DS1C, DS2 and DS3, of what is known as the PDH, or the Plesiochronous Digital Hierarchy) in higher speed synchronous communication on the optical links.

Communication according to the SONET standard makes use of a ring architecture in which a number of communication nodes are connected by optical links to form a ring. A SONET ring typically has a number of nodes each of which includes an add/drop multiplexer (ADM). Each of the nodes is coupled to two neighboring nodes by optical paths. Communication passes around the ring in a series of synchronous fixed-length data frames formatted according to a Synchronous Transport Signal (STS) standard. Each ADM is configured to pass a portion of the communication on the ring without modifying it, to extract ("drop") a portion of the communication destined for that node, and to "add" outbound communication leaving the node to the optical path. The granularity of adds and drops in ADMs is typically an STS-1, which carries a DS3 rate data stream. The dropped and added communication passes between the ADM and local communication equipment, such as a multiplexer, which multiplexes a number of separate traffic streams. For example, an added or dropped communication stream may be a 1.5 Mb/s (DS1) data stream on which separate 64 kb/s (DS0) telephone channels that are multiplexed. The DS1 data stream is multiplexed onto (added to) the optical path and passed between particular nodes on the SONET ring. Typically, a SONET ring is provisioned to provide fixed-rate bidirectional communication streams, also known as virtual paths, between different ADMs on the ring. The virtual paths couple the separate communication streams that enter and leave the SONET ring at the ADMs. In operation, the virtual paths coupling different communication streams, including their allocated data rates, typically remain fixed for long periods of time.

The process of multiplexing standard rate data streams into higher rate streams is a basic feature of SONET communication. Multiplexed data streams pass between nodes in a SONET ring at particular data rates. These rates form a hierarchy of standard rate streams that are defined as part of the SONET standards. At the lowest rates, a VT1.5 virtual tributary supports a 1.5 Mb/s data rate. This is the data rate of a common DS1 (T1) service, and can support up to 24 separate 64 kb/s (DS0) data streams. A VT2 virtual tributary supports approximately 2 Mb/s data, and a VT6 virtual tributary approximately supports 6 Mb/s. These virtual tributaries are typically the smallest units of communication that are added or dropped at an ADM. Virtual tributaries can be combined into a virtual tributary (VT) group, which can consist of 4 VT1.5, 2 VT2 or 1 VT6 virtual tributaries, and entire VT groups can be added and dropped at an ADM.

In different configurations of SONET rings, communication on the optical links can be at different data rates and use various forms of multiplexing. In one mode, a series of synchronous STS-1 frames includes a series of Synchronous Payload Envelopes (SPEs), which can be used to carry 45 Mb/s data between the SONET nodes. The series of SPEs can carry a raw data rate of 45 Mb/s or can be used to carry seven VT groups, each of which can multiplex multiple equal-size virtual tributaries. The STS-1 frame adds control and overhead data to the SPE for transmission. The STS-1 frame can be optically encoded as an OC-1 signal for transmission over an optical link, or multiplexed as three STS-1 frames to an STS-3 frame and optically encoded as an OC-3 signal for transmission over a higher capacity optical link. An STS-3 frame can alternatively carry a concatenated STS3c payload envelope, which carries data at 150 Mb/s. The STS-3 frame can multiplexed still further, for instance four STS-3 frames to a STS-12 frame, which is in turn optically encoded as an OC-12 signal. Likewise, a SONET frame could be a concatenated STS-48c frame encoded as an OC48 optical signal, and a single payload envelope accounts for the entire OC48 payload.

SONET uses pointers in the frames to compensate for frequency and phase variations of the clocks used to transmit and receive data. Each STS-1 frame includes a pointer (H1,H2 bytes) in the transport overhead (TOH) of that frame to the offset of start of the SPE in that frame. When multiple sequences of STS-1 frames are dropped at an ADM, the ADM determines start of each of the SPEs separately based on the offsets in the respective STS-1 frame. When VTs are carried within an SPE, each VT can also include a VT payload pointer (V1,V2 bytes), which specifies the alignment of the VT within the SPE. In general, the phase of the incoming SPEs have no particular relationship to the phase of the synchronous STS frames.

Clocking in SONET networks is typically organized with a master-slave relationship with clocks of the higher-level nodes feeding the timing signals to lower-level nodes. The internal clock of a SONET node can derive its timing from an external source, such as a Building Integrated Timing Supply (BITS), in which case it serves as a master for other SONET nodes to which it is connected. At slave nodes, the internal clock is derived using "line timing" from an incoming OC-n signal. Typically, a SONET ring is configured to have one node timed to an external source, and the remaining nodes timed off the ring as slaves.

Although all nodes in a SONET ring are timed to a common source, there may nevertheless be small frequency differences (jitter/wander), which result due to several reasons, including span lengths between nodes. To accommodate these small frequency differences between an incoming signal and an outgoing signal, the SONET pointer mechanisms provides positive and negative justification opportunities. The frequency justification is particularly applicable when multiplexing lower rate signals into a higher rate synchronous signal.

Pointer processing is also used to account for differences in phase between the receive and transmit frames. When a payload is passed from the input to the output of a node, a phase adjustment between the payload is performed by adjusting the value contained in the H1-H2 bytes in the TOH of outbound STS frame. Hence, if the phase of the incoming STS frame is different from the transmitted frame, the SPE within the passed-through STS frame is multiplexed from the receive frame into the appropriate location within the transmit frame, and the H1-H2 bytes within the transmitted STS frame's TOH are adjusted to reflect the new position of the SPE. Therefore, the incoming SPE is transmitted to the outgoing SONET frame with minimum delay, even if the phase difference of the incoming and outgoing STS frames are substantially different. When the payloads of multiple STS-1 frames are multiplexed into a larger frame, traditional SONET ADMs process the pointers for each STS-1 payload within the multiplexed frame independently. For instance, in an OC-48 SONET frame in which 48 STS-1 frames are multiplexed, the ADM performs separate pointer processing on each of the 48 STS-1 frames. Note that the ADM performs pointer processing for all the STS-1 frames, not only those involved in add or drop functions at that node. Typically all the outbound STS-1 frames are synchronized to a common phase, and the H1-H2 pointers are manipulated in all outbound STS-1 frames to indicate the offsets of the SPEs in those frames.

A traditional SONET ADM breaks up a synchronous STS-n frame into channels of fixed/integral granularity, typically STS-1 or STS-3. The multiplexing/demultiplexing mechanisms are broken up into two stages. First, individual STS-n channels are added/dropped/passed-through at each node. Each of the dropped STS-n channels are broken down further to identify the particular VTs which need to be extracted. This requires either an entire STS-n channel to be added/dropped at a particular node off a ring, or additional VT cross-connect logic is necessary at the back-end of the STS cross-connect/add/drop logic to multiplex lower speed streams into an STS-n. This can cause severe fragmentation and under-utilization of a SONET frame, particularly as SONET scales to higher bandwidths.

SUMMARY

In one aspect, in general, this invention is a method for processing communication at a node in a communication system. A series of fixed-length data frames are received over the communication system at the node. Multiple data streams are multiplexed in this series of fixed-length frames. Each of the data streams originates from a corresponding source of data in the communication system. At least two of the data streams originate from a same source of data. For each of the series of fixed-length frames, multiple offsets within the fixed-length frame are identified, each of these offsets being associated with a different one of the sources of data. The data streams which are multiplexed in the series of fixed-length frames are then processed. For each of the data streams, in each of the series of fixed-length frames, that data stream is processed according to the offset identified for that frame that is associated with the source of that data stream.

The invention can include one or more of the following features:

The offsets within a fixed-length frame are identified by accessing overhead data encoded in the frame to identify offsets that each characterizes a displacement relative to the start of the frame. Each of these displacements is associated with a different one of the sources of data.

Processing the data streams further includes extracting the one or more of the data streams from the series of fixed-length frames for transmission from the communication network.

The method further includes receiving multiple data streams, and multiplexing these data streams into a second series of fixed-length data frames for transmission over the communication network. Multiplexing the data streams includes computing an offset for each of the second series of fixed-length data frames and storing data for each of the received data streams according to the computed offset.

The communication system includes a SONET network. Receiving each of the series of fixed-length data frames includes receiving a SONET synchronous payload envelope (SPE) that is transported in the series of SONET transport frames (STS-n). The received SPE can be a concatenated payload envelope.

Identifying the multiple offsets for each fixed-length data frame includes using data encoded in the SPE to identify offsets which each characterizes a displacement relative to the start of the SPE that is associated with a different one of the sources of data. Each source of data corresponds to a different node in the communication network.

Identifying an offset which characterizes a displacement relative to the start of the SPE includes identifying SONET row offsets within the SPE.

Processing the data streams includes identifying a range of SONET columns associated with each one or more of the data streams and identifying row offsets for each of these data streams according to the row offsets within the SPEs associated with the sources of the data streams.

Processing the data streams further includes extracting ("dropping") the one or more of the data streams from the series of SPEs for transmission from the SONET network.

Processing the data streams further includes multiplexing the data streams in a second series of SPEs for transmission in a second series of transport frames, and then transmitting the second series of fixed-length frames over the communication system. Multiplexing the data streams includes storing multiple row offsets in each of the second series of SPEs. In each SPE each row offset corresponds to a different source node in the SONET network. Multiplexing the data streams further includes storing data for each data stream in the second series of SPEs to maintain a same relationship to the row offset corresponding to the source node as that data had to the row offset corresponding to the source node in the series of SPEs received over the communication network.

The method further includes identifying a column offset associated with each source of data. Multiplexing the data streams in the second series of SPEs then includes determining columns in the second series of SPEs to multiplex each data stream according to the columns used by those data streams in the received series of SPEs and the column offsets.

The method further includes receiving multiple data streams, and multiplexing ("adding") these data streams into a second series of SPEs for transmission over the SONET network. Multiplexing the data streams includes computing a row offset for each of the second series of SPEs and storing data for each of the received data streams according to the computed row offset.

In another aspect, in general, the invention is a propagated signal embodied in a communication medium comprising a series of fixed-length data frames each of said fixed length frames including a plurality of offset values, each offset value being associated with a different one of a plurality of sources of data, and data for a plurality of data streams originating at the sources of data, wherein each offset value identifies offsets within the fixed-length frame for data streams originating at the source of data associated with said offset value.

Aspects of the invention can include one or more of the following advantages:

A system configured according to this invention does not necessarily limit the size of multiplexed channels to certain discrete rates, such as VT1.5, STS-1 etc.

The method provides a method of efficiently mapping virtual tributaries into concatenated frames.

The method scales well with increased data rates since pointer processing scales approximately according to the number of nodes in the system rather than to the number of channels being processed.

Other features and advantages of the invention are apparent from the following description, and from the claims.

DESCRIPTION

Figure 1:
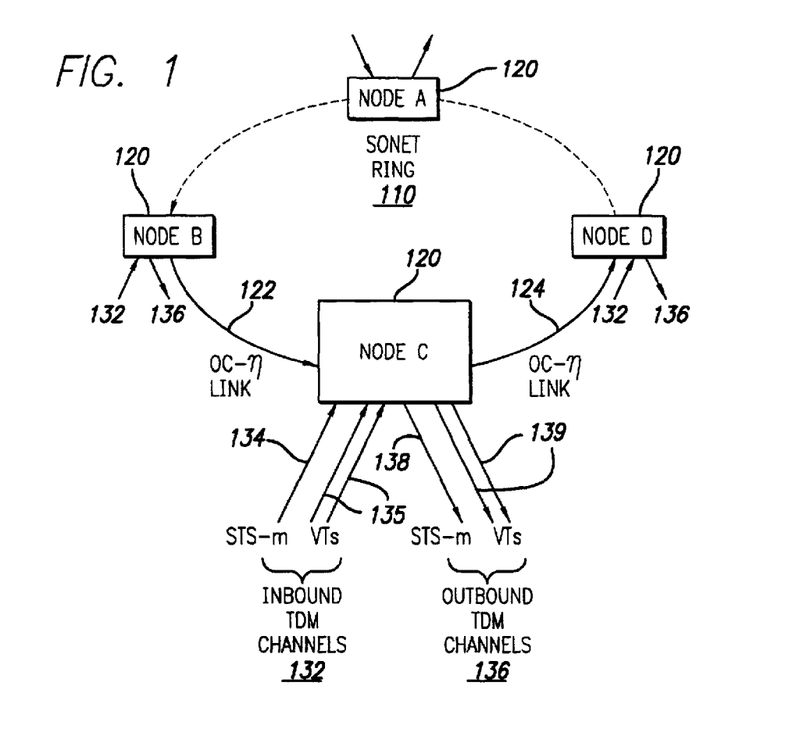
FIG. 1 is a block diagram of a SONET ring in which TDM channels are passed from node to node over the ring.

Referring to FIG. 1, a SONET ring 110 that is configured according to this invention includes a number of nodes 120 coupled by high-speed optical links. In this embodiment, the optical links are standard OC-n links, in particular OC-48 links. A particular node C accepts data over the ring over OC-n link 122 from a node B 120, and passes data over the ring over OC-n link 124 to a node D 120. Each node 120 accepts data from other network elements (not shown) over a number of inbound TDM channels 132, which it then passes over OC-n link 124 to other nodes 120 over ring 110. Each node also provides data, which it accepts from other nodes 120 over OC-n link 122, to the other network elements over a number of outbound TDM channels 136. Inbound TDM channels 132 can include an STS-m channel 134 ($m \leq n$) and a number of lower-rate VTs 135. Similarly, outbound TDM channels 136 can include an STS-m channel 138 and a number of VTs 139.

According to the invention, each node 120 receives STS-n frames on its inbound OC-n link and transmits STS-n frames on its outbound OC-n link. Node 120 processes pointers in the inbound STS-n frames and sets pointers in the outbound STS-n frames in order to pass data from the inbound to the outbound STS-n frames, and perform add/drop and multiplexing functions. Each node 120 manages an entire concatenated STS frame and processes and sets pointers within the concatenated frame.

It should be understood that in alternative embodiments, the pointer manipulation which is described below in the context of a SONET system is applicable to other synchronous communication systems, such as in systems using point-to-point and mesh arrangements of optical links, in systems in which data links use framing formats other than STS-n frames, and in systems using different link layers, such as wavelength multiplexed optical links and radio frequency links. Also, in alternative embodiments, alternative SONET architectures, for instance using bidirectional rings and redundant rings can be used.

As is apparent from the description below, there is essentially no limit on the value of n. For instance, OC-n links in the ring can be OC-48, OC-192, or OC-768. The data rate of the OC-n links of SONET ring 110 does not directly affect the overhead of pointer manipulation at a node 120 for a given number of nodes 120 in the ring and a given configuration of inbound and outbound TDM channels 132, 136 at that node. As a result, the amount of pointer processing at a node does not scale by a factor of 4 if OC-48 links are replaced by OC-192 links.

Figure 2:
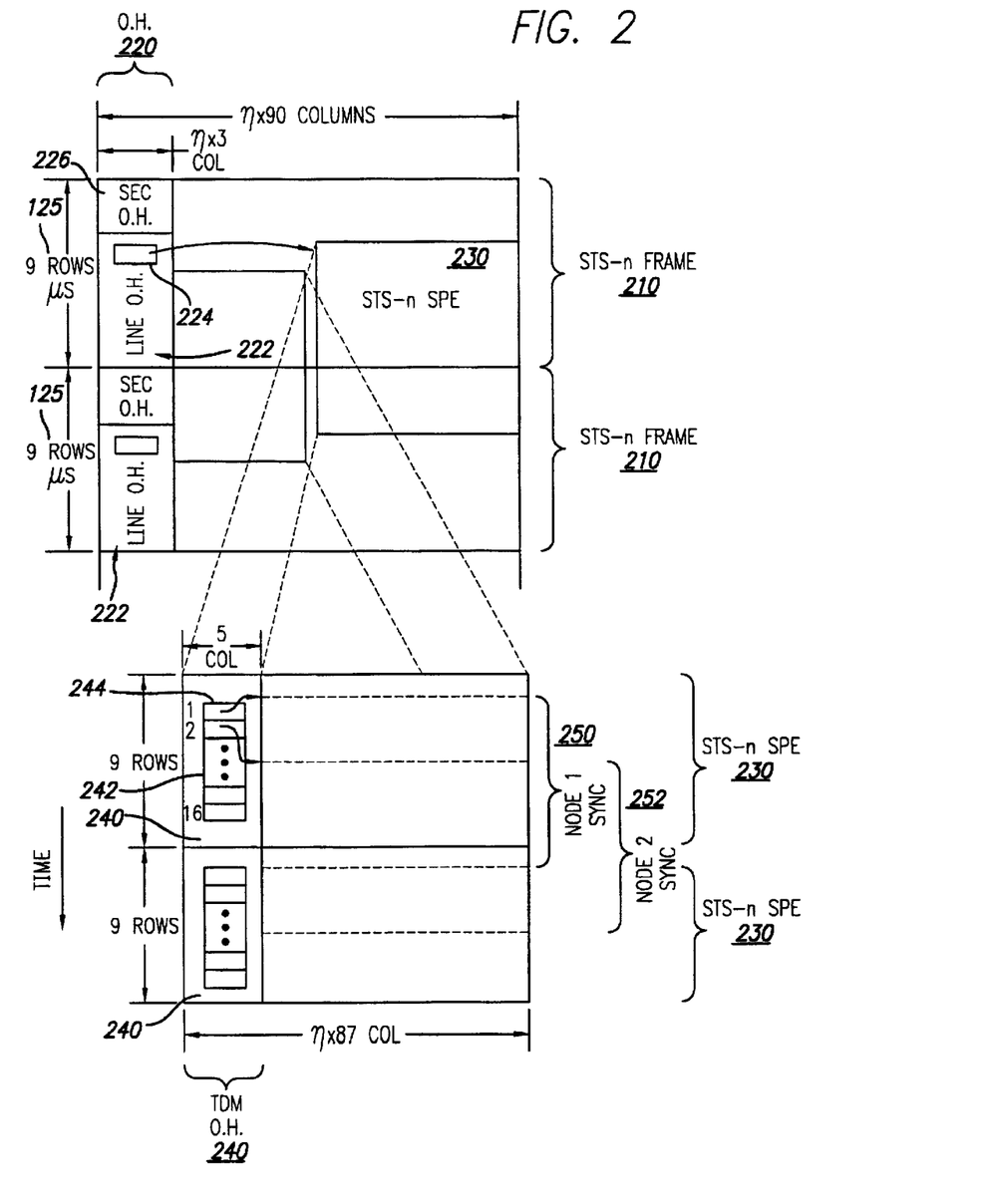
FIG. 2 is a diagram illustrating the structure of synchronous SONET frames used to transport TDM channels.

Referring to FIG. 2, data flowing over the OC-n links of SONET ring 110 use a standard STS-n format. Each frame is represented as 90n columns and 9 rows of bytes (810n bytes), and the rows are transmitted one after another at a rate of 125 microseconds per frame. As in standard STS-n frames in which the payload is concatenated, 3n columns are used for transport overhead 220, and the remaining 87n columns are used for the concatenated payload. It should be noted that although in various figures ranges of columns are illustrated as being contiguous for ease of discussion, these ranges of columns may in fact be interleaved in a transmitted frame.

In each STS-n frame 210, transport overhead 220 includes line overhead 222 and section overhead 226. Line overhead 222 includes an offset pointer 224 to the starting byte of STS-n SPE 230, which is the payload of STS-n frame 210. Typically, the SPE spans part of two successive STS frames.

Each STS-n SPE 230 includes a TDM overhead 240, in this embodiment using 5 columns of the SPE. The remaining 87n-5 columns are used to carry TDM data. In each SPE, TDM overhead 240 includes a pointer array 242. Each entry in the array is a row offset pointer (ROP) 244 which is associated with a different one of nodes 120 on SONET ring 110. In this embodiment, pointer array 242 has 16 entries thereby supporting rings of up to 16 nodes. A row offset pointer 244 for a node indicates the starting row for synchronizing all data streams originating at that node. As illustrated in FIG. 2, node 1 has a ROP 244 that indicates the starting row for synchronizing data originating (added) at node 1. The data originating at node 1 is segmented into 9-row segments, one of which is illustrated as node 1 synchronized rows (node 1 sync) 250. ROP 244 for node 2 is illustrated as having a different row offset. Therefore, data added at node 2 is synchronized to a different phase than data added at node 1. Note that the number of entries in pointer array 242 is related to the number of nodes in the ring and is not necessarily related to the number of data streams, such as separate STS-1 channels, that are passed between the nodes. In alternative embodiments in which more than 16 nodes 120 are present on SONET ring 110, a larger number of row offset pointers, such as 32 pointers or 64 pointers, can be used to accommodate the larger number of nodes.

Figure 3:
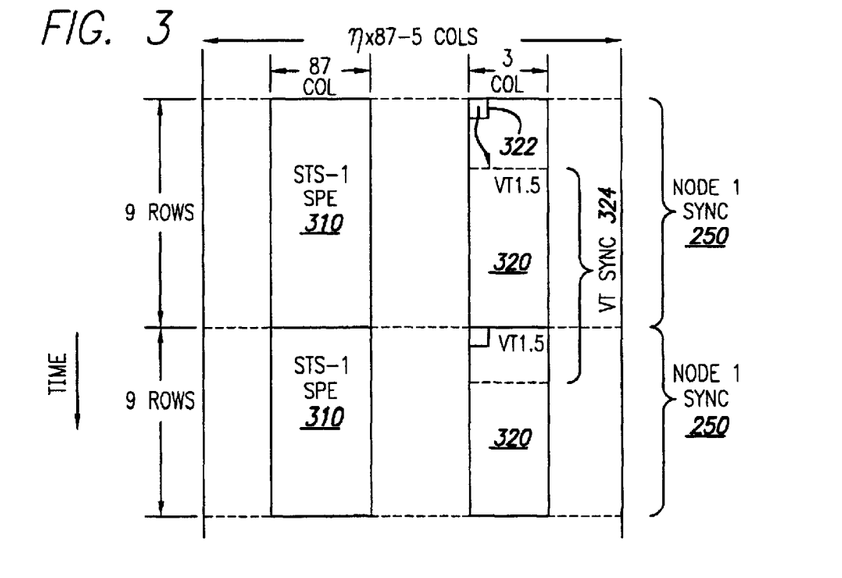
FIG. 3 is a diagram illustrating TDM channels synchronized according to an offset pointer associated with the source of the channels.

Referring to FIG. 3, spans of node 1 synchronized rows 250 are illustrated along with framing of a representative series of STS-1 SPE 310 added at node 1, and a representative VT 320 added at node 1. Note that the SPE 310 is synchronized such that its starting row corresponds to the starting row of node 1 sync 250, which is offset from the starting row of the STS-n SPE according to ROP 244 for node 1 (see FIG. 2) and the SPE is offset from the STS-n frame according to offset pointer 224. VT 322 is also synchronized with node 1 sync 250. As illustrated, the VT is a floating VT whose phase is indicated by a offset pointer 322 that is located relative to the starting row for node 1. Therefore, the VT can have a VT frame sync 324 that differs from node 1 sync 250.

Referring back to FIG. 1, a representative node C 120 performs the functions of passing some data from its inbound link 122 to its outbound link 124, adding data from inbound TDM channels 132 to outbound link 124, and dropping data from inbound OC-n link 122 to outbound TDM channels 136. Each of these functions involves manipulation of various pointers and offsets described above.

Figure 4:
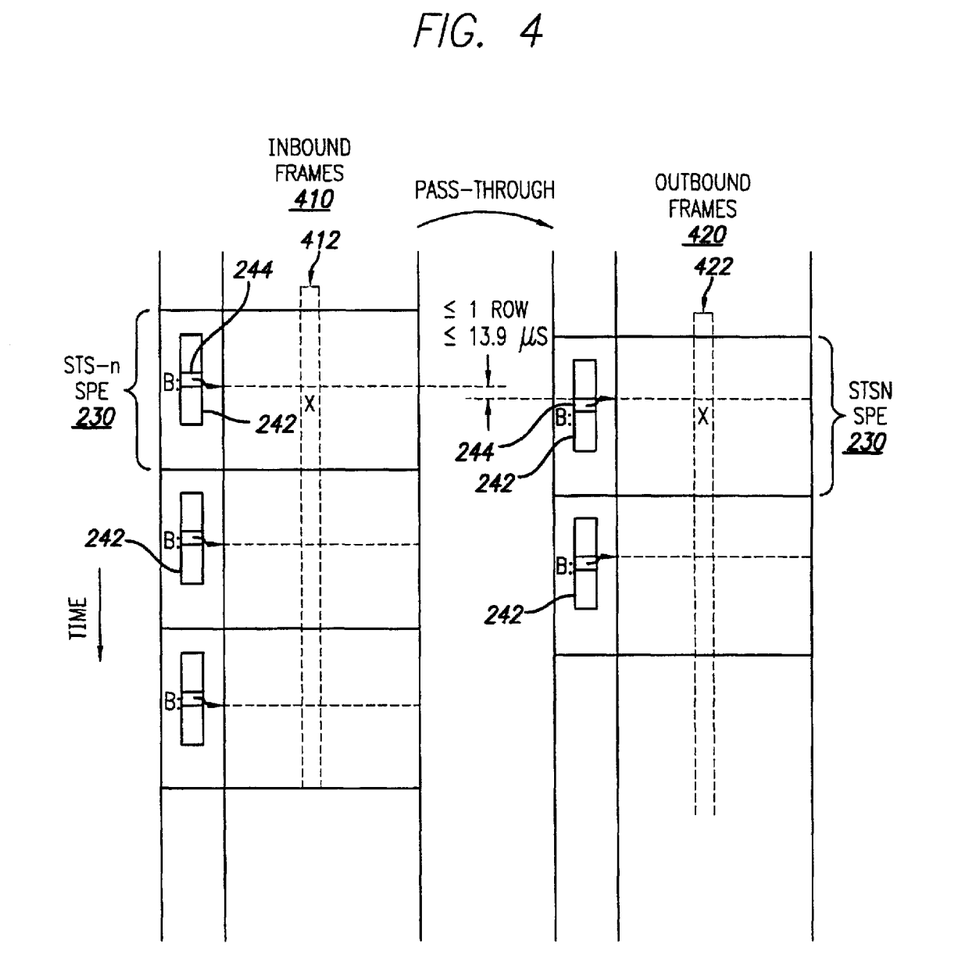
FIG. 4 is a diagram that illustrates passing data through a node.

Referring to FIG. 4, a series of inbound frames 410, which are shown as a series of STS-n SPE 230 that have already been extracted from the STS-n frames 210 (FIG. 2) and a series of outbound frames 420 are shown. Note that the inbound and outbound frames are synchronized, but are not typically in phase. That is, there is a time difference between the start of an inbound SPE and the start of a corresponding outbound SPE that typically exceeds the time taken to transmit one row of the frame. If data were delayed so that data in the first row of an inbound frame were transmitted in the first row of an outbound frame, then the delay introduced at the node would typically exceed the maximum allowable delay of 25 micro-seconds that is specified by the GR-253 standard that governs operation of SONET nodes.

As illustrated in FIG. 4, a representative column 412 that originated at node B 120 is to be passed through the node for transmission without modification. Recall that as illustrated in FIG. 2, data originating at node B is synchronized according to row offset pointer 244 associated with row B. As node C 120 passes this and other columns originating at node B, it adjusts ROP 244 for node B to correspond to the first row in the outbound frame that starts at a time after the start of the row in the inbound frame pointed to by ROP 244 for node B in the input frame. A byte, indicated by the X in FIG. 4, in the first row from node B is transmitted in the first row from node B in the outbound frame at the same column offset. In this way, byte X incurs at most a 1-row delay as it passes through node C. A 1-row delay corresponds to less than 13.9 microseconds, thereby satisfying the GR-253 specification. Note that the row offset pointers 244 in the outbound frames, other than the pointer associated with the node passing the data, are typically all incremented (modulo 9) by the same amount relative to the corresponding row offset pointers in the input frames. Other columns originating at node B are also offset according to ROP 244 in inbound frames 410 and to ROP 244 in outbound frames 420. In alternative embodiments, each entry in the offset pointer array can be a byte pointer, instead of a row offset pointer. By using a byte pointer, less than a one-byte delay can be incurred at a node rather than a less than a one-row delay that can be incurred using a row offset pointer. Other granularity of offset pointers, for example, greater than a byte and less than a row, can alternatively be used.

Figure 5:
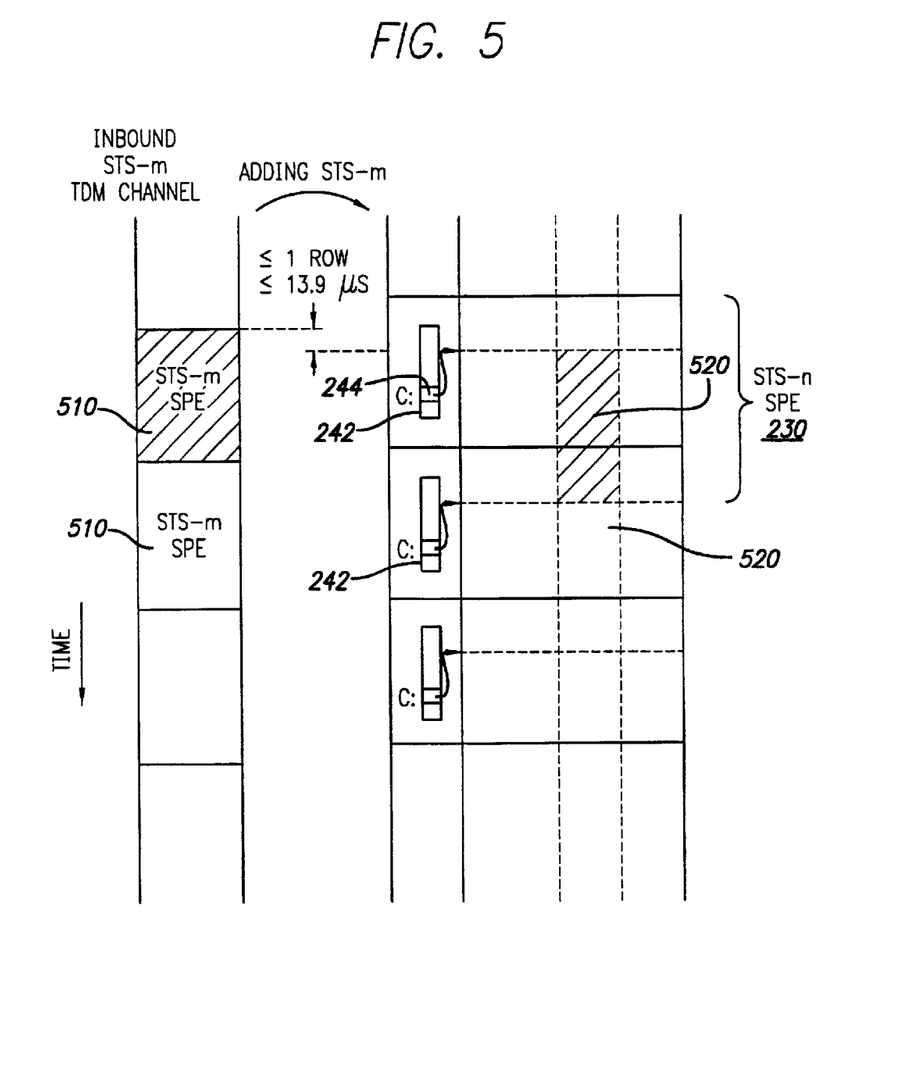
FIG. 5 is a diagram that illustrates adding and STS channel at a node.

Referring to FIG. 5, the procedure by which a series of STS-m SPE 510 are added at node C 120 is illustrated. Note that the STS-m SPE may be an STS-1 SPE, and STS-3c concatenated SPE, or another size of concatenated SPE. As illustrated in FIG. 5, a single series of STS-m SPE is added at the node. In each outbound frame, the row offset pointer 244 for node C (the adding node) is set to point to the first row starting after the start of the inbound STS-m SPE that is being added. The data in each STS-m SPE 510 is then inserted into the appropriate columns of the outbound frame synchronized with the row offset pointers for node C in each frame. Note that in this way, the delay introduced in adding the stream to the outbound frame is less that 1 row, or 13.9 microseconds. When multiple STS-m channels are added at node C, they are all added at the same offset according to ROP 244 for node C.

If an inbound STS-m TDM channel 134 includes a multiplexing of multiple lower rate STS channels, for example an STS-12 which includes two STS-1 channels, the SPEs for each of the STS-1 channels are synchronized to the same row offset pointer for the node at which they are being added.

Figure 6:
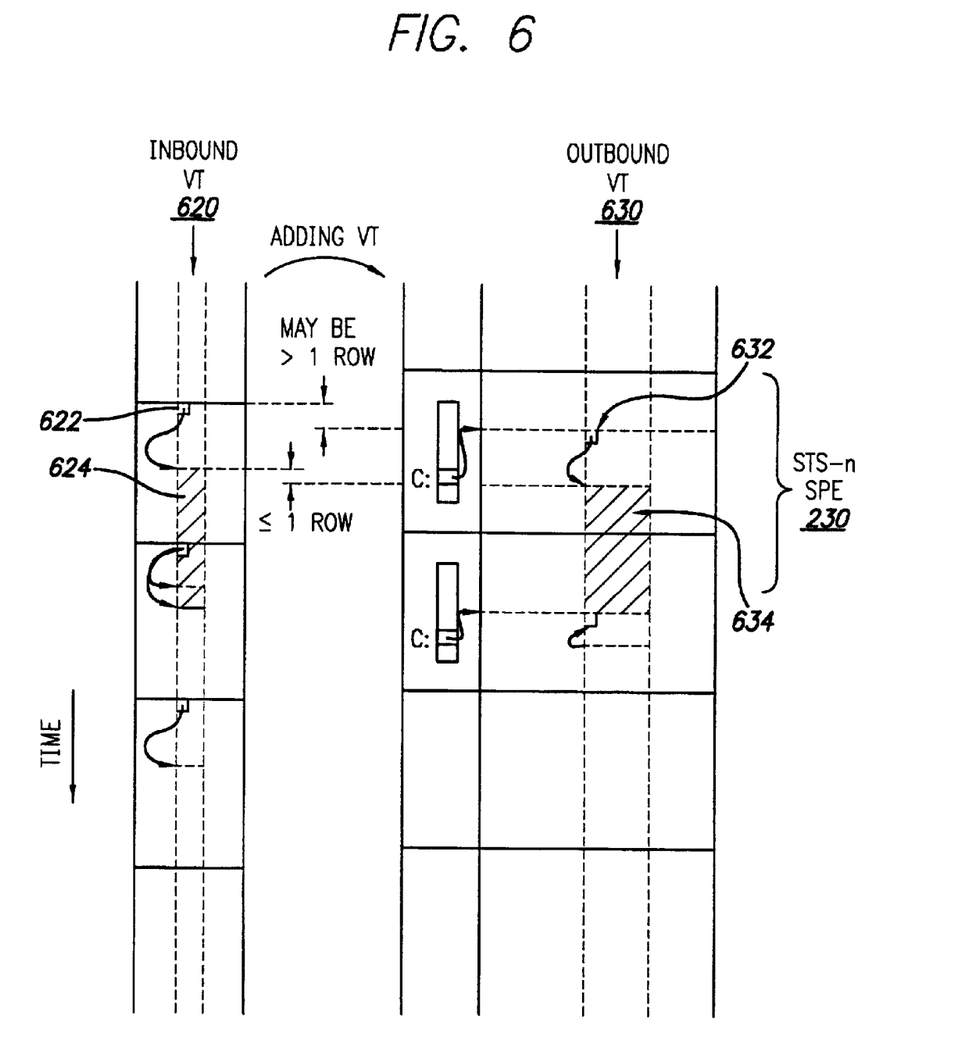
FIG. 6 is a diagram that illustrates adding a virtual tributary at a node.

Referring to FIG. 6, the process by which a virtual tributary is added to an outbound STS-n SPE 230 is illustrated. The inbound VT is illustrated as multiplexed in an inbound SPE, for example as part of a VT group of a standard STS-1 channel, although the VT can be equivalently received by node 120 using other framing approaches, such as over a T1 circuit. In FIG. 6, row offset pointer 244 for node C in the outbound STS-n SPE 230 is not necessarily set according to the framing of the VT. For example, the row offset pointer may be determined by an STS-m channel that is added at that node. In the outbound VT 630, in the first row associated with node C (the adding node) a VT offset pointer 632 indicates the start of VT frame 634. If multiple VTs are added at the node, then VT offset pointer 632 is adjusted independently for each VT.

Dropping channels that originate at a particular node involves the reverse of the pointer processing described above. In particular, after extracting the STS-m SPE, the node dropping the channels determines the row offset for the originating node, and then extracts the appropriate columns according to the row offset for the originating node. Note that if multiple channels are extracted that have originated at a single node, they are all synchronized by the row offset for that originating node. For instance if 12 STS-1 channels are being dropped at a node, all 12 STS-1 SPEs that are being dropped are synchronized to the same starting row. Therefore the dropping node does not have to perform separate pointer manipulation for each of the dropped STS-1 channels, as would generally be the case of standard SONET techniques.

Figure 7:
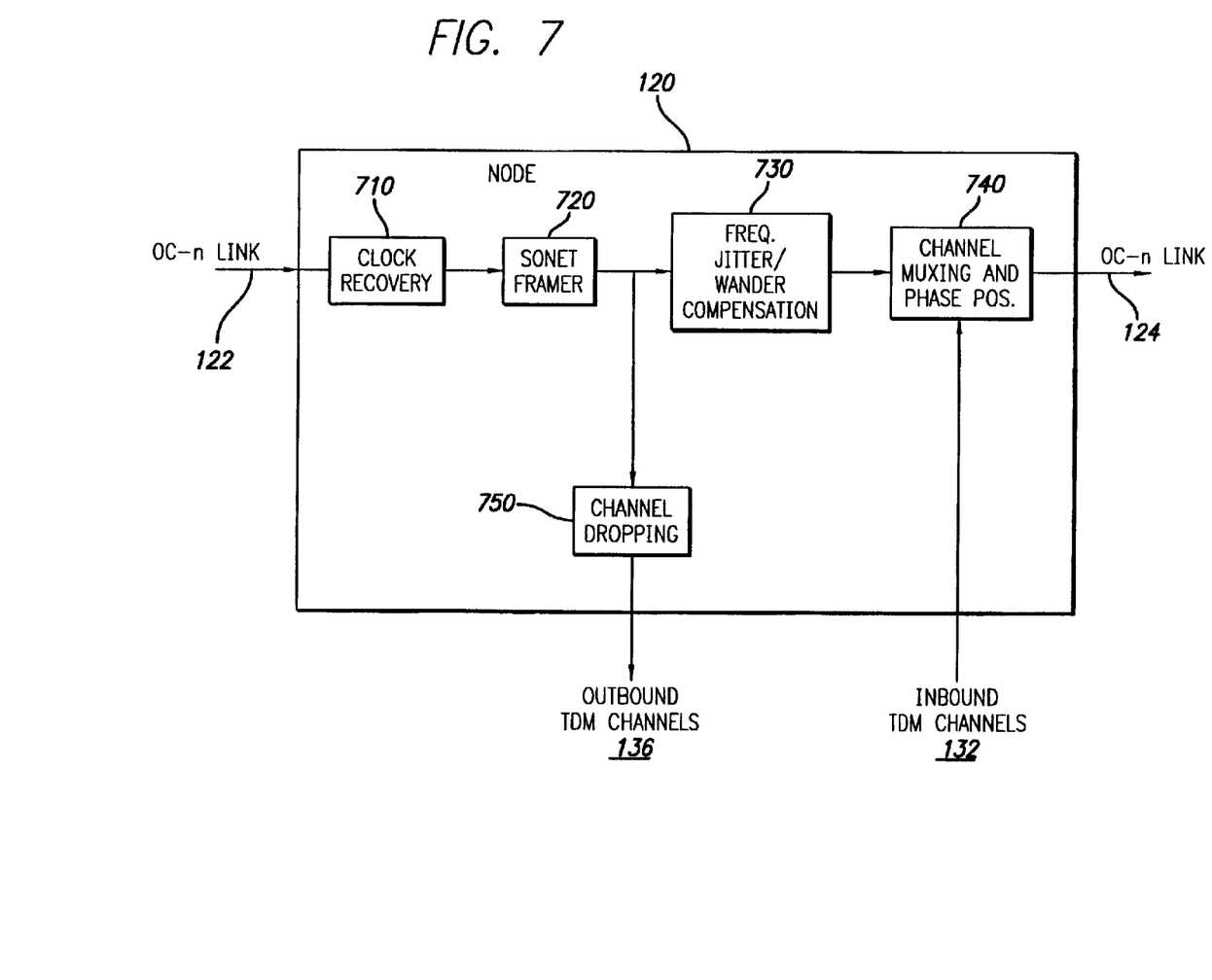
FIG. 7 is a block diagram of processing elements of a node.
Figure 8:
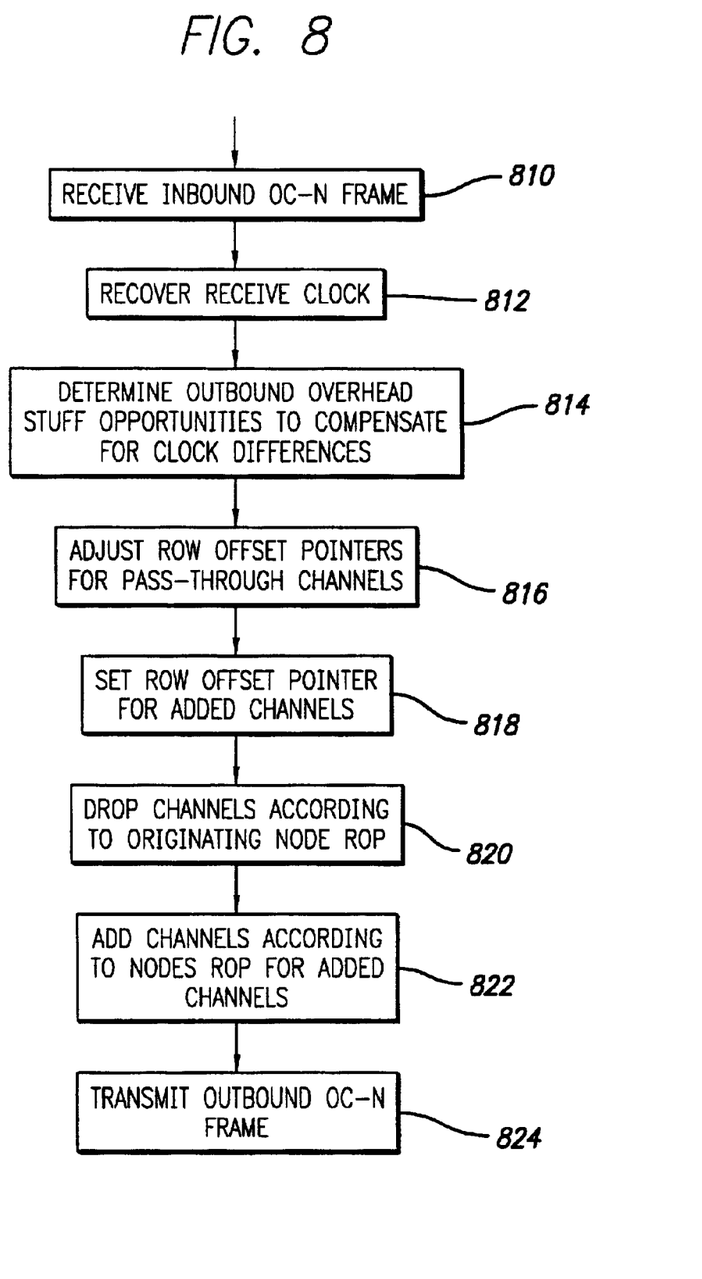
FIG. 8 is a flowchart illustrating processing steps performed at a node.

Referring to FIG. 7, node 120 includes a number of processing modules that operate in a pipelined manner. The flowchart illustrated in FIG. 8 identifies various processing steps performed by these modules. Data is received from the ring over OC-n link 122 (step 810) and passed to clock recovery 710 where the receive clock is determined (step 812). Based on differences between the recovered clock and the system clock for the node, overhead stuff opportunities are determined in order to account for jitter and wander of the receive clock relative to the system clock (step 814) at frequency wander/jitter compensation 730. The row offset pointers are adjusted for the passed through channels (step 816) at channel multiplexing and phase adjustment 740, and the row offset point for the added channels is also set (step 818). At channel dropping 750 channels are dropped according to the row offset pointers for the originating node or nodes (step 820) and channels are added at channel multiplexing and phase adjustment 740 (step 822). Finally, the assembled frame is transmitted on outbound OC-n link 124 (step 824). It should be understood that these steps are performed in a pipelined manner and are not necessarily performed in the order presented in the flowchart.

Referring back to FIG. 4, each TDM channel is assigned to a particular column or columns of the SPE. That is, a particular TDM channel that is passed through a node occupies the same column 422 in an outbound frame 420 and the column 412 in an inbound frame 410. By default, all columns pass through a node. As a node receives instructions to add or drop columns via an out-of-band provisioning process, the node maintains a column map that establishes a correspondence between channels and column offsets.

In an alternative embodiment, a particular TDM channel does not necessarily occupy the same columns over all links that it traverses. Changes in the column map at each node are optionally used in an approach to reduce delay. In addition to adjusting the row offsets for each originating node in the ring, an overall mapping of columns is performed at each node. In this approach, data passing around the ring does not necessarily remain in the same column as it is passed through nodes according to the provisioning of the channel carrying that data. A particular TDM channel is assigned a different set of columns on each link in the ring. The columns assigned to a particular TDM channel are chosen to minimize the delay in passing data through the node. In the previous embodiment, a TDM channel could experience at most a 1-row (13.9 microsecond) delay based on using the row-offset pointers alone. By adjusting the column map, the delay for any TDM channel is reduced to a small fraction of a row delay. Each node transmits the column map to its downstream neighboring node using an out-of-band mechanism when the map changes. Note that the column map does not necessarily change very often. For example, the map can be changed when an upstream link goes down and then comes up.

Figure 9:
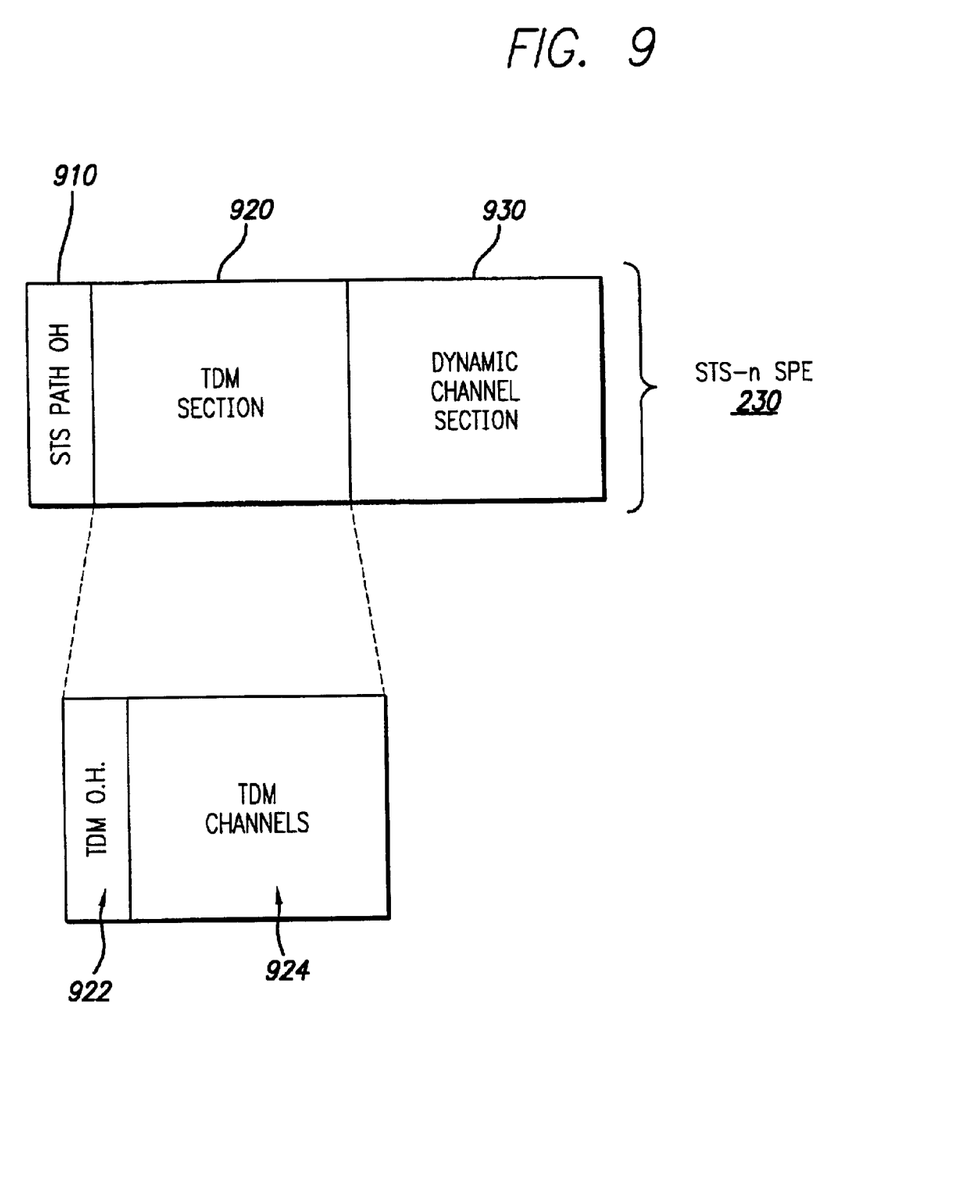
FIG. 9 is a diagram illustrating the structure of a SONET frame which includes both TDM channels and dynamic data.

In another embodiment, the approach of the above embodiments is introduced into the system described in U.S. application Ser. No. 09/536,416, "Transport of Isochronous and Bursty Data on a SONET Ring" (hereinafter the "parent application"). In the parent application, an STS-n SPE, or a fixed subset of columns of such an SPE, are reserved for both TDM and dynamic data (see FIGS. 5A–B of the parent application). Referring to FIG. 9, such an SPE includes a TDM section 920, a dynamic channel section 930, and an STS path overhead 910. In this alternative embodiment, the columns of TDM section 920 are managed using the approach described above. That is, a number of columns (e.g., 5 columns) of the TDM section are devoted to TDM overhead 922, which the remaining columns 924 of TDM section 920 are devoted to carrying the data of the TDM channels.

In another alternative embodiment, framing on the OC-n links does not use an STS-n standard. Instead, TDM overhead 240 includes sufficient information to identify frame boundaries, and includes stuffing and frequency adjustment opportunities that are needed to compensate for clock jitter and wander between the received and transmitted clocks at a node.

In yet other embodiments, the approach described above is applied to communication systems other than SONET networks. These other communication systems include SDH systems, which make use of STM-n framing, as well as other systems in which data from multiple sources is multiplexed in fixed or variable length frames. Furthermore, in alternative embodiments, the offsets are not necessarily associated with sources of data that correspond to nodes in communication system, for example, being associated with different sources outside the system, or to individual sources at a single node.

It is to be understood that the foregoing description is intended to illustrate and not to limit the scope of the invention, which is defined by the scope of the appended claims. Other embodiments are within the scope of the following claims.

What is claimed is:

1. A method for processing communication at a node in a communication system comprising:

receiving at said node a series of fixed-length data frames over the communication system, including receiving a plurality of data streams multiplexed in the series of fixed-length frames, each of the data streams originating from a corresponding one of a plurality of sources of data in the communication system and at least two of said data streams originate from a same source of data;

for each of the series of fixed-length frames, identifying a plurality of offsets within said fixed-length frame, each of said offsets being associated with a different one of the plurality of sources of data, wherein identifying the offsets within a fixed-length frame includes accessing overhead data encoded in said frame to identify offsets that each characterizes a displacement relative to the start of the frame that is associated with a different one of the sources of data; and processing the data streams multiplexed in the series of fixed-length frames, including, for each of the data streams, in each of the series of fixed-length frames, processing said data stream according to the offset identified for said frame that is associated with the source of said data stream.

2. The method of claim 1 wherein processing the data streams further includes extracting the one or more of the data streams from the series of fixed-length frames for transmission from the communication network.

3. The method of claim 1 further comprising receiving a plurality of data streams, and multiplexing said data streams into a second series of fixed-length data frames for transmission over the communication network, wherein multiplexing said data streams includes computing an offset for each of the second series of fixed-length data frames and storing data for each of the received data streams according to the computed offset.

4. The method of claim 1 wherein the communication system comprises a SONET network and receiving each of the series of fixed-length data frames includes receiving a SONET synchronous payload envelope (SPE) transported in the series of SONET transport frames.

5. The method of claim 1 wherein receiving a SONET SPE includes receiving a concatenated payload envelope.

6. The method of claim 1 wherein identifying the plurality of offsets for each fixed-length data frame includes using data encoded in an SPE to identify offsets which each characterizes a displacement relative to the start of the SPE that is associated with a different one of the sources of data, each source of data corresponding to a different node in the communication network.

7. The method of claim 6 wherein identifying an offset which characterizes a displacement relative to the start of the SPE includes identifying SONET row offsets within the SPE.

8. The method of claim 7 wherein processing the data streams includes identifying a range of SONET columns associated with each one or more of the data streams and identifying row offsets for each of said data streams according to the row offsets within the SPEs associated with the source of said data stream.

9. The method of claim 8 wherein processing the data streams further includes extracting the one or more data streams from the series SPEs for transmission from the SONET network.

10. The method of claim 8 wherein processing the data streams further includes multiplexing said data streams in a second series of SPEs for transmission in a second series of transport frames, and transmitting the second series of fixed-length frames over the communication system, wherein multiplexing the data streams includes storing a plurality of row offsets in each of the second series of SPEs, in each SPE each row offset corresponding to a different source node in the SONET network, and multiplexing the data streams further includes storing data for each data stream in the second series of SPEs to maintain a same relationship to the row offset correspond to the source node as that data had to the row offset corresponding to the source node in the series of SPEs received over the communication network.

11. The method of claim 10 further comprising identifying a column offset associated with each source of data, and wherein multiplexing the data streams in the second series of SPEs includes determining columns in the second series of SPEs to multiplex each data stream according to the columns used by those data streams in the received series of SPEs and the column offsets.

12. The method of claim 7 further comprising receiving a plurality of data streams, and multiplexing said data streams into a second series of SPEs for transport over the SONET network, wherein multiplexing said data streams includes computing a row offset for each of the second series of SPEs and storing data for each of the received data streams according to the computed row offset.

13. A communication device comprising:

means for receiving at said node a series of fixed-length data frames over the communication system, including receiving a plurality of data streams multiplexed in the series of fixed-length frames, each of the data streams originating from a corresponding one of a plurality of sources of data in the communication system and at least two of said data streams corresponding to a same source of data;

for each of the series of fixed-length frames, means for identifying a plurality of offsets within said fixed-length frame, each of said offsets being associated with a different one of the plurality of sources of data, wherein the means for identifying the offsets within a fixed-length frame includes means for accessing overhead data encoded in said frame to identify offsets that each characterizes a displacement relative to the start of the frame that is associated with a different one of the sources of data; and means for processing the data streams multiplexed in the series of fixed-length frames, including, for each of the data streams, in each of the series of fixed-length frames, processing said data stream according to the offset identified for said frame that is associated with the source of data corresponding to said data stream.

* * * * *